No. 606,963. Patented July 5, 1898.
A. D. FENWICK.
STANDING COLLAR.
(Application filed July 8, 1897.)
(No Model.) 2 Sheets—Sheet 1.
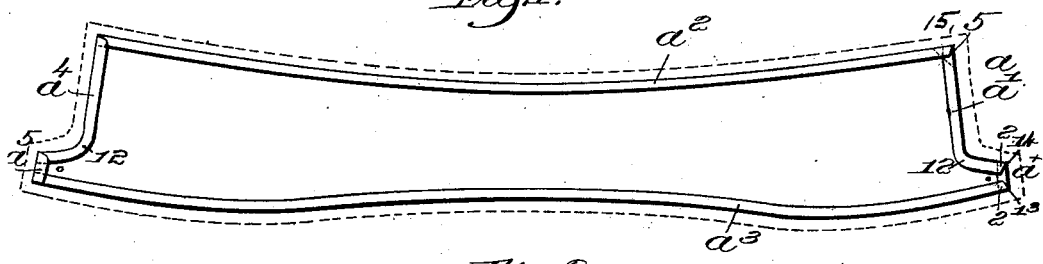
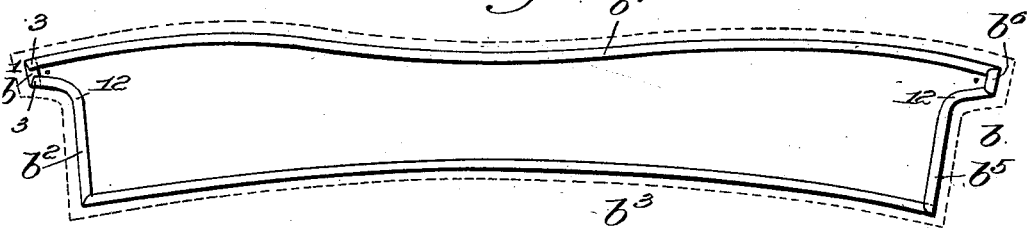
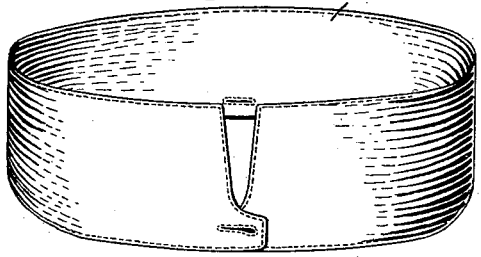
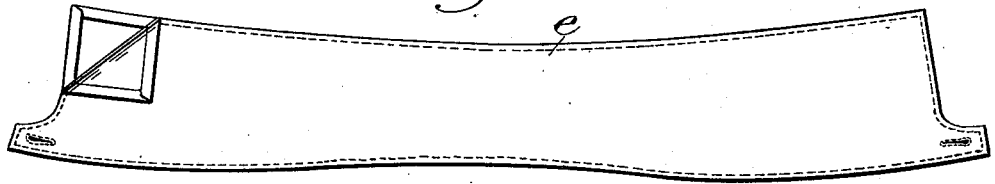
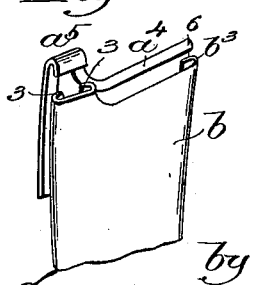
Witnesses:
Fred. S. Greenleaf.
Thomas E. Drummond.
Inventor
Albert D. Fenwick.
by Crosby & Gregory
attys.
THE NORRIS PETERS CO., PHOTO-LITHO., WASHINGTON, D. C.

No. 606,963. Patented July 5, 1898.
A. D. FENWICK.
STANDING COLLAR.
(Application filed July 8, 1897.)
(No Model.) 2 Sheets—Sheet 2.
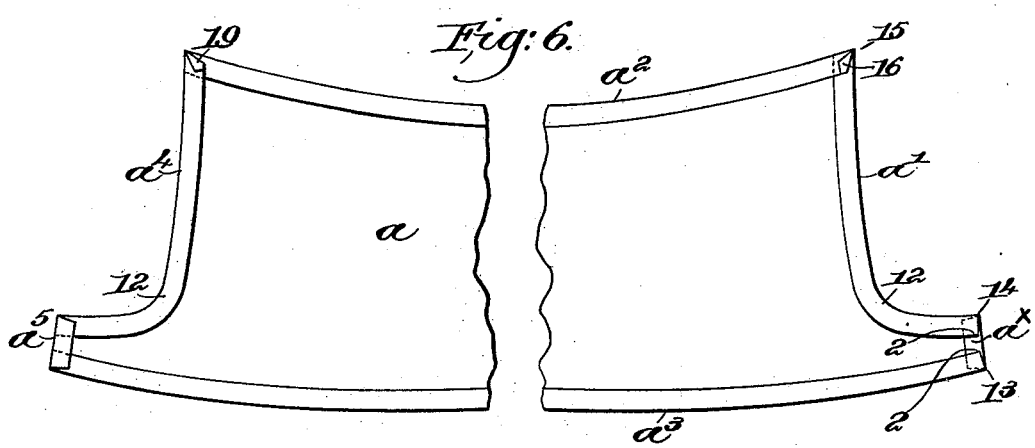
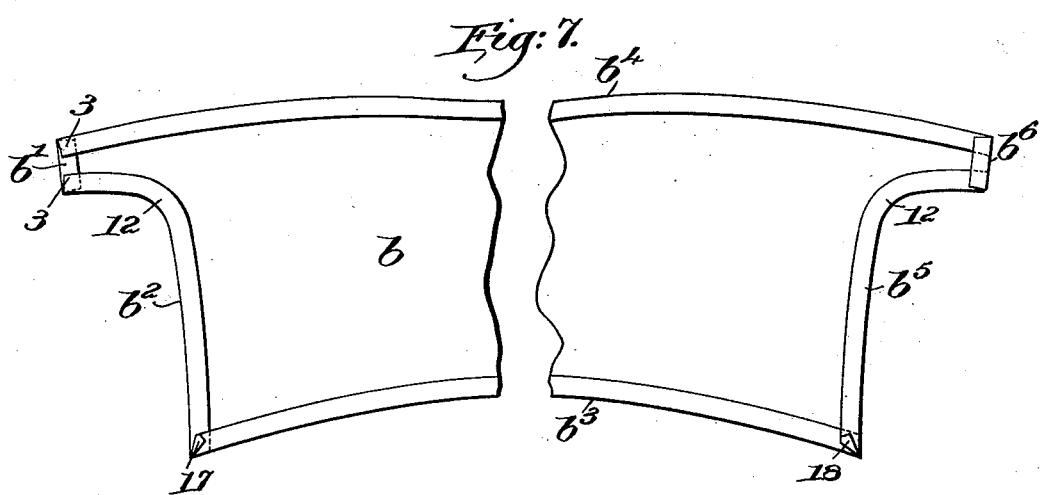
Witnesses.
Edward F. Allen.
Thomas L. Drummond.
Inventor.
Albert D. Fenwick.
by Crosby Gregory.
Attys.

UNITED STATES PATENT OFFICE.

ALBERT D. FENWICK, OF PHILADELPHIA, PENNSYLVANIA, ASSIGNOR TO THE FENWICK COLLAR AND CUFF MACHINE COMPANY, OF PORTLAND, MAINE.

STANDING COLLAR.

SPECIFICATION forming part of Letters Patent No. 606,963, dated July 5, 1898.

Application filed July 8, 1897. Serial No. 643,831. (No model.)

*To all whom it may concern:*

Be it known that I, ALBERT D. FENWICK, of Philadelphia, county of Philadelphia, and State of Pennsylvania, have invented an Improvement in Standing Collars, of which the following description, in connection with the accompanying drawings, is a specification, like letters and figures on the drawings representing like parts.

This invention has for its object the production of a novel standing collar.

Figure 1 represents one part or ply of a standing collar, and Fig. 2 another part or ply thereof. Fig. 3 shows the two ends of said plies nearly put together to illustrate how the said plies may be interlocked. Fig. 4 shows the two plies stitched together to form a collar, one corner of the outer ply being, however, turned over to expose the folds; and Fig. 5 shows the completed collar. Fig. 6 is an enlarged plan view showing in detail the respective ends of one part or side, as shown in Fig. 1, the middle portion thereof being broken away. Fig. 7 is a similar enlarged view of the opposite side of the collar, as shown in Fig. 2.

Referring to Figs. 1 and 2, $a$ and $b$ may represent pieces of linen to be made into a collar, these pieces constituting the inner and outer sides of a standing collar, and with these pieces there may be put one or more intermediate plies for stiffening, all in usual manner. The piece $a$ has its small end $a^\times$ and then the end $a'$ infolded, and thereafter the edges $a^2$ and $a^3$ are infolded, and then the end $a^4$ $a^5$, leaving a sort of a hook at $a^5$ at one end, while at the opposite end there are corners 2 2, overlapping an inturned end $a^\times$. Referring to Fig. 2, representing another ply or side of the collar, the end $b'$ is first inturned, then the end $b^2$ is inturned, leaving a corner 3 overlapping the inturned end $b'$, and thereafter the longer edges $b^3$ and $b^4$ are inturned, and then the end $b^5$ and $b^6$, the inturned portion $b^6$ constituting a hook like the inturned portion $a^5$, each hook entering its own appropriate space behind or back of the corners 2 and 3 referred to. The part Fig. 2 may be turned upwardly over onto the part Fig. 1, and the hook $b^6$ may be inserted under the corners 2 and the hook $a^5$ of the part shown in Fig. 1 under the corners 3, and in this condition the collar will be stitched together by the line of stitching $e$. (See Figs. 4 and 5.)

Fig. 3 shows the hooked end $a^5$ ready to be put behind the corners 3, and in putting together the two parts of the collar the inturned longer edge $b^3$ of the part $b$ will be hooked in behind the corner 6 at the top of the edge $a^4$.

Referring to Figs. 1 and 2, it will be seen that the inturned ends $a'$ $a^4$ and $b^2$ $b^5$ are turned in on a curve at 12, and to do this the material has to be stretched at that point, and it will also be seen that each end of the collar presents three corners, said corners being marked in Fig. 1 at the right as 13, 14, and 15.

To properly make the last kind of a corner, especially when it presents an acute angle, the overlapping edges $a^2$ and $b^3$ of one of the plies, as at 16 and 17, (see Figs. 6 and 7,) and the overlapping ends $b^5$ and $a^4$, are also provided, as at 18 and 19, with supplemental infolds laid or folded over on top of the other folds, said infolds being necessary to enable one inturned edge to lie snugly and evenly on another. The plies being infolded, as shown in Figs. 1 and 2, the infolded portions are laid face to face, and the plies are then stitched together through and through from one to the other end of the collar, the curved portion 12 of the infolded ends affording additional strength to the collar at that point, so that said collar is not apt to be torn off from the buttonhole-tab in use.

Heretofore it has been customary to stitch together the plies of the standing collar when the same are superimposed one on the other and then to turn the stitched portions inside out, and to provide for this it has been necessary to notch or cut away a portion of the collar at the junction of the tab with the corner end, thus leaving a weakened portion which is liable to be easily torn.

Having fully described my invention, what I claim, and desire to secure by Letters Patent, is—

1. A standing collar, composed of plies forming the opposite sides of the collar, each side having at one end an inturned hook or overlapping end, and having its opposite end underlapped by the adjacent folds at the corners which are overlapped on said end, the plies of said opposite sides of the collar being interlocked by the insertion of the said hook of one against the underlapped end of the other under the said overlapped folds at said corners, both ends of the collar being interlocked, the side having the hook locked into the opposite side at one end receiving the hook from the said opposite side at the other end, and said plies so folded and interlocked being stitched together through and through, substantially as described.

2. A standing collar, composed of plies forming the opposite sides of the collar, each side having its top edge inturned, and an inturned end overlapped by said top-edge fold at one end, and an inturned end overlapping said top-edge fold at the other end, the plies of said opposite sides of the collar being placed and secured together with an overlapping end of the inner side against the overlapped end of the outer side, and the overlapped end of the inner side against the overlapping end of the outer side, substantially as described.

3. A standing collar, composed of inner and outer plies, each similarly folded, the inturned end at one end of a ply overlapping the top-edge fold and at the other end of said ply being overlapped by said edge fold, the said inturned ends having their folds extending down even and unbroken from the top edge to the tabs of the collar, and the said similarly-folded outer and inner plies being placed together face to face with an underlapped end of the inner ply flatwise against an overlapped end of the outer ply at one end, and at the other end an overlapped end of the inner ply flatwise against an underlapped end of the outer ply, said plies being stitched together through and through, substantially as described.

4. A standing collar composed of inner and outer plies of material, having all of its edges inturned, each of said plies having at its opposite upper corners a supplementary inner fold laid or folded over on top of the other inturned folds, to thus enable an acute-angled corner to be presented, substantially as described.

In testimony whereof I have signed my name to this specification in the presence of two subscribing witnesses.

ALBERT D. FENWICK.

Witnesses:
 GEO. W. GREGORY,
 MARGARET A. DUNN.